United States Patent
Matula et al.

(10) Patent No.: US 7,962,537 B2
(45) Date of Patent: Jun. 14, 2011

(54) DETERMINING A TABLE OUTPUT OF A TABLE REPRESENTING A HIERARCHICAL TREE FOR AN INTEGER VALUED FUNCTION

(75) Inventors: David W. Matula, Dallas, TX (US); Mitchell A. Thornton, Dallas, TX (US); Alexandru Fit-Florea, Palo Alto, CA (US); Lun Li, Santa Clara, CA (US)

(73) Assignee: Southern Methodist University, Dallas, TX (US)

( * ) Notice: Subject to any disclaimer, the term of this patent is extended or adjusted under 35 U.S.C. 154(b) by 1022 days.

(21) Appl. No.: 11/768,742

(22) Filed: Jun. 26, 2007

(65) Prior Publication Data

US 2008/0005211 A1    Jan. 3, 2008

Related U.S. Application Data

(60) Provisional application No. 60/816,529, filed on Jun. 26, 2006.

(51) Int. Cl.
  *G06F 7/00* (2006.01)
(52) U.S. Cl. .................................................... 708/200
(58) Field of Classification Search .............. 708/200
  See application file for complete search history.

(56) References Cited

U.S. PATENT DOCUMENTS

| | | | | |
|---|---|---|---|---|
| 4,482,975 A | * | 11/1984 | King et al. | 708/272 |
| 5,179,659 A | * | 1/1993 | Lien et al. | 708/650 |
| 5,274,580 A | * | 12/1993 | Keryvel et al. | 708/653 |
| 5,923,888 A | | 7/1999 | Benschop | 395/750.01 |
| 5,963,460 A | * | 10/1999 | Rarick | 708/501 |
| 6,404,923 B1 | * | 6/2002 | Chaddha | 382/224 |
| 6,581,085 B1 | * | 6/2003 | Yue et al. | 708/502 |
| 2009/0248873 A1 | * | 10/2009 | Johnsson | 709/226 |

OTHER PUBLICATIONS

Bryant, Randal E., "*Graph-Based Algorithms for Boolean Function Manipulation*[12]", IEEE Trans. Comp., 35(8), 28 pages, 1986.

Fit-Florea, A., et al., "*Addition-based exponentiation modulo $2^k$*", Electronics Letters, vol. 41, No. 2, 2 pages, Jan. 20, 2005.

Fit-Florea, A., et al., "*Additive bit-serial algorithm for discrete logarithm modulo $2^k$*", Electronics Letters, vol. 41, No. 2, 2 pages, Jan. 20, 2005.

Li, L., et al., "*Hardware Implementation of an Additive Bit-Serial Algorithm for the Discrete Logarithm Modulo $2^k$*", Proceedings of the IEEE Computer Society Annual Symposium on VLSI, New Frontiers in VLSI Design, 0-7695-2365-X/05, 6 pages, 2005.

Matula, David W., et al., "*Table Lookup Structures for Multiplicative Inverses Modulo $2^k$*", Proc. 17th IEEE Symp. Comp. Arith., 8 pages, 2005.

\* cited by examiner

*Primary Examiner* — Tan V Mai

(74) *Attorney, Agent, or Firm* — Baker Botts L.L.P.

(57) ABSTRACT

Determining a table output of a table representing a hierarchical tree for an integer valued function includes determining an address from a table input. A subset of a memory is selected according to the address, where the memory represents the hierarchical tree and the subset represents a subtree of the hierarchical tree. Bit fields are selected from the subset, and bits are extracted from the bit fields. A table output is determined from the extracted bits.

24 Claims, 4 Drawing Sheets

DETERMINING A TABLE OUTPUT OF A TABLE REPRESENTING A HIERARCHICAL TREE FOR AN INTEGER VALUED FUNCTION

RELATED APPLICATION

This application claims benefit under 35 U.S.C. §119(e) of U.S. Provisional Application Ser. No. 60/816,529, entitled "DESIGN OF LOOKUP TABLE STRUCTURES FOR INTEGER VALUED FUNCTIONS," filed Jun. 26, 2006, by David W. Matula et al.

TECHNICAL FIELD

This invention relates generally to the field of calculating systems and more specifically to determining a table output of a table representing a hierarchical tree for an integer valued function.

BACKGROUND

Calculating integer valued functions may involve table lookup of a table stored in memory. Known table lookup techniques, however, fail to provide satisfactory hardware support for certain integer valued functions. It is generally desirable to have satisfactory hardware support for integer valued functions.

SUMMARY OF THE DISCLOSURE

In accordance with the present invention, disadvantages and problems associated with previous techniques for calculating integer valued functions may be reduced or eliminated.

According to one embodiment of the present invention, determining a table output of a table representing a hierarchical tree for an integer valued function includes determining an address from a table input. A subset of a memory is selected according to the address, where the memory represents the hierarchical tree and the subset represents a subtree of the hierarchical tree. Bit fields are selected from the subset, and bits are extracted from the bit fields. A table output is determined from the extracted bits.

Certain embodiments of the invention may provide one or more technical advantages. A technical advantage of one embodiment may be that a system includes hardware support for integer valued functions. The hardware support may allow for more efficient calculation of integer valued functions.

Another technical advantage of one embodiment may be that the system represents a hierarchical tree for an integer valued function. The system includes a lookup table that stores bits representing at least a portion of the tree. The table has subsets (such as rows). Each subset is associated with particular lower order values of operands and stores bits representing sub-trees corresponding to the lower order values. The lower order values of an input operand serve as an address to select the appropriate subset to calculate the table output for the operand. Organizing the lookup table into such subsets may allow for a reduced table size.

Another technical advantage of one embodiment may be that the system performs pre-processing of the input operand to generate table input for the table. For example, the operand may be normalized to determine a binary exponent for the operand. As another example, a sign bit of the operand may be determined. Pre-processing may allow for a reduced table size.

Another technical advantage of one embodiment may be that the system performs post-processing of table output to generate the function output. For example, the table output may be de-normalized. As another example, conditional complementation may be performed on the table output. Post-processing may also allow for a reduced table size.

Another technical advantage of one embodiment may be that one or more circuits may be used to generate the function output. For example, a circuit may be used to select the appropriate subset and/or generate at least a portion of the function output.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
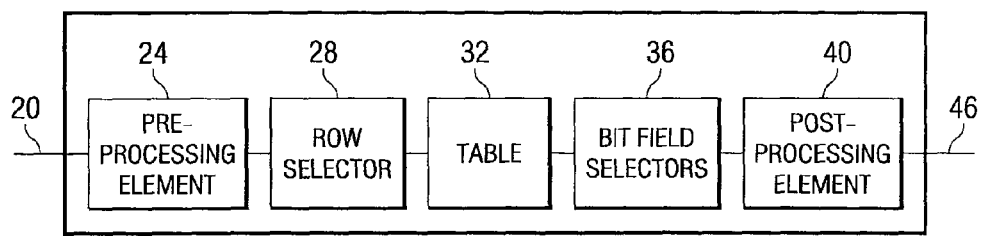
FIG. 1 illustrates one embodiment of a system for determining a table output of a table representing a hierarchical tree for an integer valued function.

FIG. 1 illustrates one embodiment of a system 10 for determining a table output of a table representing a hierarchical tree for an integer valued function. In the illustrated embodiment, system 10 includes an input interface 20, a pre-processing element 24, a row selector 28, a table 32, one or more bit selectors 36, a post-processing element 40, and an output interface 46.

System 10 represents a hierarchical tree for an integer valued function that generates a function output from an input operand. Table 32 stores bits representing at least a portion of the tree. Table 32 may have subsets (such as rows). Each subset is associated with lower order values of operands and stores bits representing sub-trees corresponding to the lower order values. The lower order values of an input operand serves as an address to select the appropriate subset to calculate the table output for the operand.

In the embodiment, input interface 20 receives an input operand. Pre-processing element 24 generates a table input from the input operand. For example, pre-processing element 24 may normalize the operand to determine a binary exponent for the operand and/or may determine a sign bit of the operand.

The table input includes lower order (less significant) values that serve as an address. Row selector 28 selects the subset of table 32 corresponding to the address. Bit field selectors 36 use higher order values to select bits from the subset, which are used to form the table output. In one embodiment, row selector 28 may be implemented as a circuit that selects the subset.

Post-processing element 40 performs additional processing to yield the function output. For example, post-processing element 40 may de-normalize the table output and/or may perform conditional complementation on the table output. Output interface 46 outputs the function output.

System 10 may be used to implement integer valued functions that satisfy certain properties, such as the inheritance, one-to-one correspondence, binary integer right-normalization, and conditional complementation properties.

According to the inheritance property, for all k, the low order k-bits of a function output depend only on the low order k-bits of the integer argument. Functions satisfying this property include squaring, multiplicative inverse, integer power, discrete logarithm, and exponentiation functions, where the functions are evaluated modulo the word size. The inheritance property implies that if input integer arguments have a common low order part of the same size, the values of the output function also have a common low order part of the same size (which may or may not be the same size as the part of the input). The inheritance property allows for reduction of a k-bits-in, k-bits-out lookup table from $k \times 2^k$ bits to $2 \times 2^k = 2^{k+1}$ bits. For example, a 16-bits-in, 16-bits-out lookup table may be reduced in size by a factor of eight.

According to the one-to-one correspondence property, distinct k-bit inputs have distinct k-bit outputs. Functions with this property include the multiplicative inverse, discrete log of odd integers, and the discrete log encoding of k-bit integers. The one-to-one correspondence and inheritance properties together allow for pre- and post-processing that may reduce the table size by a factor of k.

According to the binary integer right-normalization property, integer $n = i \times 2^p$, where i is the odd factor and $2^p$ is the even-power factor. Integer valued functions can be calculated by applying table lookup to the odd factor and then performing post-processing on the even-power factor.

According to the conditional complementation property, the result of an operation on a conditional 2's complement of the input is the conditional 2's complement of the output. Conditional complementation applies to selected bits of the odd factor of the normalized integer argument. This may reduce table size by one-half or more.

The inheritance, one-to-one correspondence, binary integer right-normalization, and conditional complementation properties allow for pre- and post-processing, which may reduce the table size by a factor of 4k (for example, by a factor of 64 for k=16).

A component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Certain logic, such as a processor, may manage the operation of a component. Examples of a processor include one or more computers, one or more microprocessors, one or more applications, and/or other logic.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to system 10 without departing from the scope of the invention. The components of system 10 may be integrated or separated according to particular needs. Moreover, the operations of system 10 may be performed by more, fewer, or other modules. Additionally, operations of system 10 may be performed using any suitable logic. As used in this document, "each" refers to each member of a set or each member of a subset of a set.

Modifications, additions, or omissions may be made to the methods described herein without departing from the scope of the invention. The method may include more, fewer, or other steps. Additionally, steps may be performed in any suitable order without departing from the scope of the invention.

Figure 2:
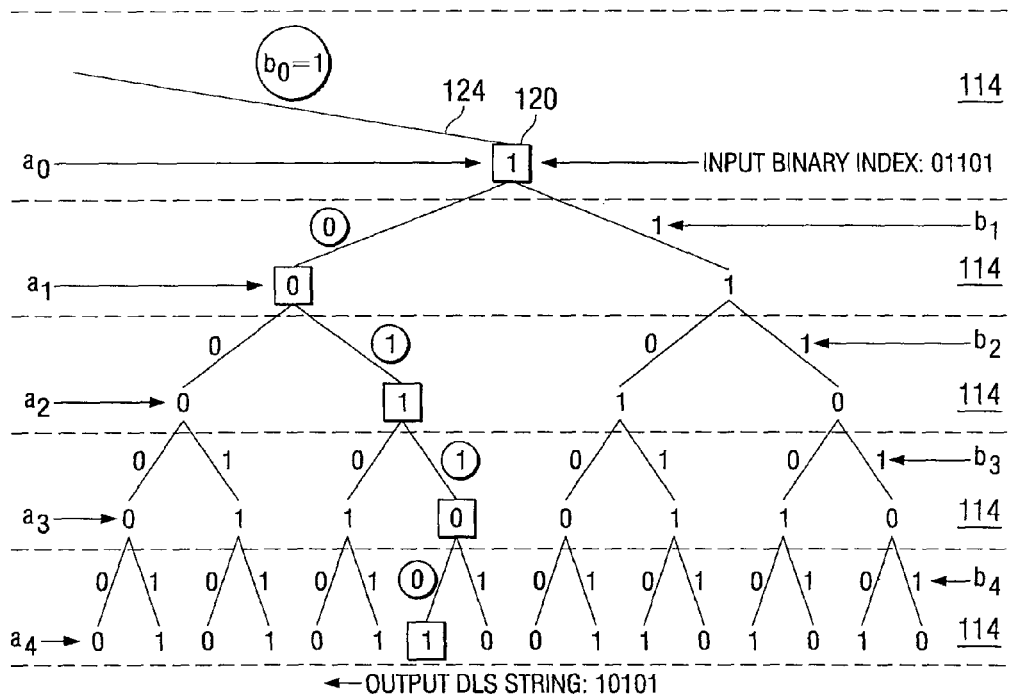
FIGS. 2 and 3 illustrate examples of hierarchical trees that may be represented by the table of the system of FIG. 1.
Figure 3:
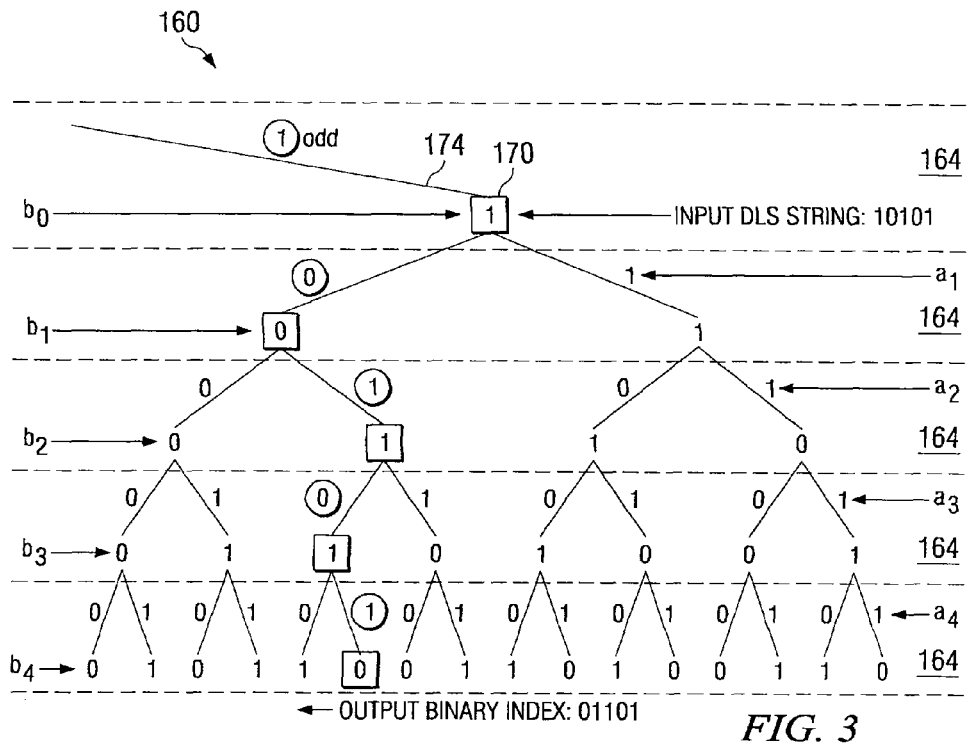

FIGS. 2 and 3 illustrate examples of hierarchical trees that may be represented by table 32. The examples are hierarchical trees for binary-to-DLS conversion and DLS-to-binary conversion. The one-to-one and conditional complementation properties hold for these conversions and are evident as symmetries in the hierarchical trees.

A k-bit integer n satisfying $0 \leq n \leq 2^k - 1$ has a modular factorization $n = |(-1)^s 2^p 3^e|_{2^k}$. Integer n may be represented by the exponent triple (s,p,e), where $0 \leq s \leq 1$, $0 \leq p \leq k$, and $0 \leq e \leq 2^{k-2} - 1$. The exponent triple (s,p,e) may be uniquely specified by further limiting the range of e and s, depending on the value of p. Binary-to-discrete log transformation refers to determining the triple (s,p,e) for a given k-bit integer n, and discrete log-to-binary inverse transformation refers to determining the integer n for a given triple (s,p,e). In one embodiment, a discrete logarithmic system (DLS) may represent integers n by their corresponding exponent triples (s,p,e). The transformations allow integer multiplication to be reduced to addition of corresponding terms of the triples.

According to one embodiment, the exponent triple (s,p,e) for a k-bit integer n may be stored as a k-bit string using variable width fields. For $0 \leq n \leq 2^k - 1$, the value of p determined by the right-shift normalization satisfies $0 \leq p \leq k-1$. Value p may be represented by the (p+1)-bit value $2^p$ right adjusted in the k-bit field. For $0 \leq p \leq 2^{k-2}$, exponent e satisfies $0 \leq e \leq 2^{k-p-2} - 1$. Exponent e may be stored in a (k−p−2)-bit field left adjusted in the k-bit field.

According to the embodiment, the lengths of the fields for e and $2^p$ may be variable. In the embodiment, the lengths of the fields for e and $2^p$ may total (k−1) bits, where a bit between the fields for e and $2^p$ may provide sign bit information. For example, the bit between the fields may be assigned the value ($e_0$ xor s). Accordingly, the length of the e field may be longer and the $2^p$ field may be shorter when more bits are needed to store entries of the e field than to store entries of the $2^p$ field. The length of the $2^p$ field may be longer and the e field may be shorter when more bits are needed to store entries of the $2^p$ field than to store entries of the e field.

Any suitable table representation of one-to-one mappings for any suitable one-to-one function may be used. According to one embodiment, the one-to-one mapping between 5-bit discrete log numbers comprising a 5-bit discrete log representation and 5-bit integers may be given by TABLE 1.

TABLE 1

| Discrete Log Number System (DLS) Encoding | Partitioned DLS Bit Strings | | | Integer Value | Standard Binary | Integer Parity |
|---|---|---|---|---|---|---|
| | $e$ | $e_0$ xor $s$ | $2^p$ | $\|(-1)^s 2^p 3^e\|_{32}$ | | |
| 00001 | 000 | 0 | 1 | 1 | 00001 | Odd |
| 00011 | 000 | 1 | 1 | 31 | 11111 | |
| 00101 | 001 | 0 | 1 | 29 | 11101 | |
| 00111 | 001 | 1 | 1 | 3 | 00011 | |
| 01001 | 010 | 0 | 1 | 9 | 01001 | |
| 01011 | 010 | 1 | 1 | 23 | 10111 | |
| 01101 | 011 | 0 | 1 | 5 | 00101 | |
| 01111 | 011 | 1 | 1 | 27 | 11011 | |
| 10001 | 100 | 0 | 1 | 17 | 10001 | |
| 10011 | 100 | 1 | 1 | 15 | 01111 | |
| 10101 | 101 | 0 | 1 | 13 | 01101 | |
| 10111 | 101 | 1 | 1 | 19 | 10011 | |
| 11001 | 110 | 0 | 1 | 25 | 11001 | |
| 11011 | 110 | 1 | 1 | 7 | 00111 | |
| 11101 | 111 | 0 | 1 | 21 | 10101 | |
| 11111 | 111 | 1 | 1 | 11 | 01011 | |
| 00010 | 00 | 0 | 10 | 2 | 00010 | Singly Even |
| 00110 | 00 | 1 | 10 | 30 | 11110 | |
| 01010 | 01 | 0 | 10 | 26 | 11010 | |
| 01110 | 01 | 1 | 10 | 6 | 00110 | |
| 10010 | 10 | 0 | 10 | 18 | 10010 | |
| 10110 | 10 | 1 | 10 | 14 | 01110 | |
| 11010 | 11 | 0 | 10 | 10 | 01010 | |
| 11110 | 11 | 1 | 10 | 22 | 10110 | |
| 00100 | 0 | 0 | 100 | 4 | 00100 | Doubly Even |
| 01100 | 0 | 1 | 100 | 28 | 11100 | |
| 10100 | 1 | 0 | 100 | 20 | 10100 | |
| 11100 | 1 | 1 | 100 | 12 | 01100 | |
| 01000 | | 0 | 1000 | 8 | 01000 | Triply Even |
| 11000 | | 1 | 1000 | 24 | 11000 | |
| 10000 | | | 10000 | 16 | 10000 | Quad. Even |
| 00000 | | | 00000 | 0 | 00000 | Zero |

Modifications, additions, or omissions may be made to TABLE 1 without departing from the scope of the invention. TABLE 1 may include more, fewer, or other fields or entries.

In TABLE 1, parsing begins from the right hand side to determine the variable length field identifying $2^p = 2^1$. Zeros are counted until the first unit bit is encountered. The next bit is a separation bit providing the logical value $s \oplus e_0$. The remaining leading bits are the 3-p bits of the exponent $0 \leq e \leq 2^{3-p} - 1$ sufficient to determine the odd factor $i = |(-1)^s 3^e|_{2^k}$. For example, if DLS=10110, $e=10_2=2_{10}$, and then $s=1$ is determined from $e_0=0$ and $s \oplus e_0 = 1$. Then, $|(-1)^1 2^1 3^3|_{32} = |-18|_{32} = 14$, or $b_4 b_3 b_2 b_1 b_0 = 01110$.

FIG. 2 illustrates one example of a hierarchical tree 110 for binary-to-DLS conversion. Hierarchical tree 110 includes levels 114 of nodes 120 and branches 124. Nodes 120 represent input binary values $b_i$, and branches 124 represent output DLS values $a_i$. A level 114 includes nodes 120 and branches 124 for a particular i.

In the illustrated example, binary value $b_4 b_3 b_2 b_1 b_0 = 01101$ is input. Value $b_0 = 1$ corresponds to $a_0 = 1$; $b_1 = 0$ corresponds to $a_1 = 0$; $b_2 = 1$ corresponds to $a_2 = 1$; $b_3 = 1$ corresponds to $a_3 = 0$; and $b_4 = 0$ corresponds to $a_4 = 1$. That is, binary string $b_4 b_3 b_2 b_1 b_0 = 01101$ yields DLS string $a_4 a_3 a_2 a_1 a_0 = 10101$.

FIG. 3 illustrates one example of a hierarchical tree 160 for DLS-to-binary conversion. Hierarchical tree 160 includes levels 164 of nodes 170 and branches 174. Nodes 170 represent input binary values $b_i$, and branches 124 represent output DLS values $a_i$. A level 164 includes nodes 170 and branches 174 for a particular index i. The values of hierarchical tree 160 may be substantially similar to the values of hierarchical tree 110.

In the illustrated example, DLS string $a_4 a_3 a_2 a_1 a_0 = 10101$ is input. Value $a_0 = 1$ corresponds to $b_0 = 1$; $a_1 = 0$ corresponds to $b_1 = 0$; $a_2 = 1$ corresponds to $b_2 = 1$; $a_3 = 0$ corresponds to $b_3 = 1$; and $a_4 = 1$ corresponds to $b_4 = 0$. That is, DLS string $a_4 a_3 a_2 a_1 a_0 = 10101$ yields binary value $b_4 b_3 b_2 b_1 b_0 = 01101$.

Figure 4:
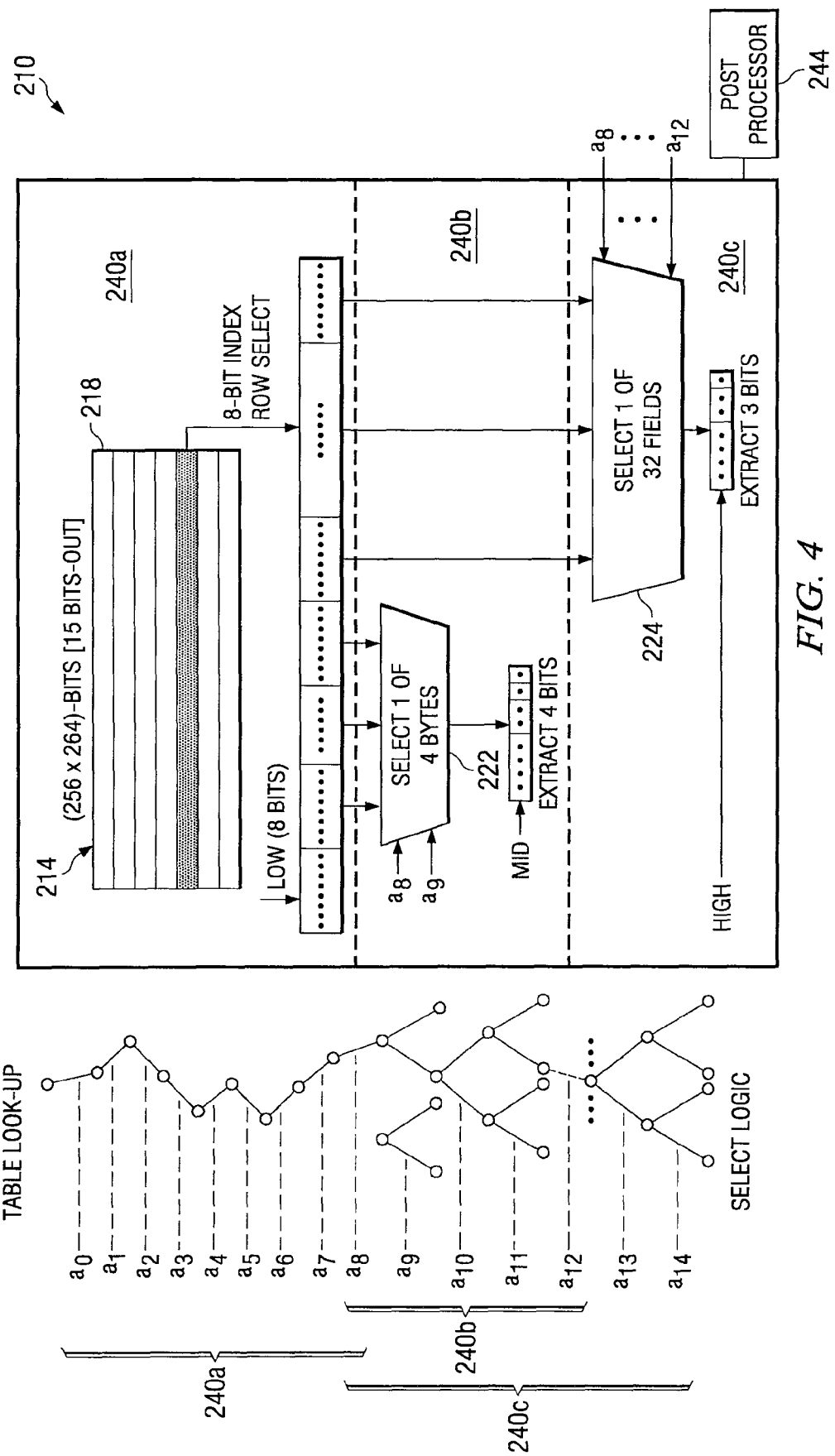
FIG. 4 illustrates an example of a table lookup system that may be used with the system of FIG. 1.

FIG. 4 illustrates an example of a table lookup system 210. Table lookup system 210 takes into account the one-to-one correspondence and conditional complementation properties of binary-to-DLS conversion. The one-to-one correspondence property allows system 210 to omit the right children of the hierarchical tree, thus storing only the left children. Conditional complementation is performed on the table output to make up for the omitted right children.

System 210 includes a memory 214, selectors 222 and 224, one or more stages 240, and a post-processing element 244. In the illustrated embodiment, system 210 receives an input operand $[a_0:a_n] = [a_0:a_{14}]$, which is sent to memory 214 as a table input $[a_0:a_{14}]$.

Memory 214 comprises rows 218. Memory 214 stores bits that represent a hierarchical tree. Each row 218 is associated with lower order values and stores bits for the sub-trees corresponding to order the lower order values. The lower order values serve as an address for a row 218. In the illustrated embodiment, memory 214 represents a hierarchical tree for table input $[a_0:a_{14}]$, more specifically, the left children of the hierarchical tree. Memory 214 has 256 rows 218, with 264 bits per row 218, where each row 218 is associated with specific lower order values $[a_0:a_8]$.

In the illustrated embodiment, system 210 includes three stages 240a-c. The first stage 240a determines an address to select a row 218. In the illustrated embodiment, first stage 240a uses the low order values $[a_0:a_7]$ of the table input as the address bits. In one embodiment, the operations of first stage 240a may be performed by a circuit that uses the low order values $[a_0:a_7]$ to select the appropriate row 218.

The second and third stages 240*b-c* determine higher order bits for the sub-trees. Selectors 222 and 224 select bit fields and then select the higher order bits from the bit fields. Selecting bits from a row 218 leaves one or more remaining bits of the row 218, where at least one remaining bit is disposed between two bit fields.

The second stage 240*b* determines middle order bits for middle-level sub-trees. In the illustrated embodiment, second stage 240*b* corresponds to four sub-trees between levels 8 and 9, which are represented by four bytes. Middle order values $[a_8:a_9]$ are used to select one of the four bytes. Four bits are extracted from the selected byte. Value $[a_{10}]$ is used to select one bit, and values $[a_{10}:a_{11}]$ are used to select another bit. The other two bits are extracted directly without selection. Thus, four bits are selected.

The third stage 240*c* selects high order bits for the high-level sub-trees. In the illustrated embodiment, there are 32 sub-trees between level 8 and level 12 formed as 32 7-bit fields. Values $[a_8:a_{12}]$ are used to select one of the 32 7-bit fields. Three bits are extracted from the selected 7-bit field. Value $[a_{13}]$ is used to select one bit from the selected field, and values $[a_{13}:a_{14}]$ are used to select another bit from the selected field. The rightmost bit is extracted directly without selection. Thus, three bits are selected. The three stages 240 concatenate the address bits and selected bits to yield a 15-bit output.

Post-processing element 244 performs conditional complementation on the table output to account for the omitted right children. In one embodiment, conditional complementation is performed by 16 2-bit-input XOR gates. The corresponding bit from the result of the padding and the input are connected to the inputs of the XOR gates. Post-processing element 244 also pads a one to the Least Significant Bit (LSB) position of the 15-bit output of the three stages 244.

Figure 5:
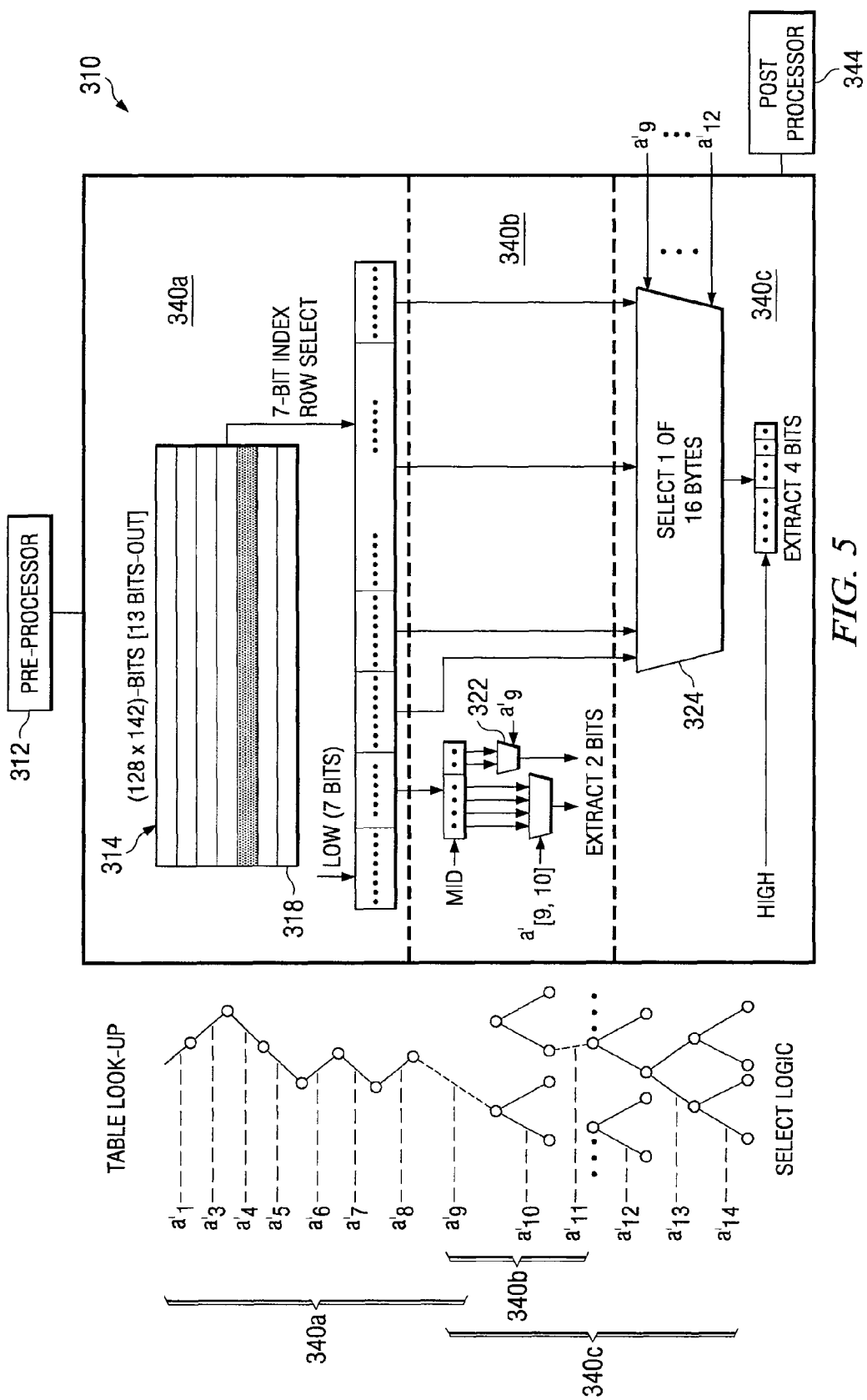
FIG. 5 illustrates another example of a table lookup system that may be used with the system of FIG. 1.

FIG. 5 illustrates another example of a table lookup system 310. Table lookup system 310 takes into account the inheritance, one-to-one correspondence binary integer right-normalization, and conditional complementation properties of binary-to-DLS conversion.

System 310 includes a pre-processing element 312, a memory 314, selectors 322 and 324, one or more stages 340, and a post-processing element 344. In the illustrated embodiment, system 310 receives an input operand $[a_0:a_n]=[a_0:a_{14}]$. Pre-processing element 312 pre-processes the input operand to yield a table input appropriate for memory 314. In one embodiment, pre-processing element 312 pre-processes the input operand $[a_0:a_{14}]$ to yield table input $[a'_1a'_3:a'_{14}]$.

In the embodiment, pre-processing element 312 determines the binary exponent p by normalizing the operand. Pre-processing element 312 shifts right and selects a bit field based on the operand, then shifts right in the selected bit field and selects a next bit field based on the operand, and so on until binary exponent p is obtained. For example, pre-processing element 312 first shifts right 8 bits and selects the lower 8 bit field or the higher 8 bit field based on the operand. Next, pre-processing element 312 shift right 4 bits of the selected 8-bit field and selects the lower 4 bit field or the higher 4 bit field. Pre-processing element 312 continues until the binary exponent p of the operand is obtained. Because the binary exponent p is known, first bit $a_0$ is not needed.

In one embodiment, pre-processing element 312 also extracts the sign bit for the operand. In the embodiment, the sign bit is the third bit $a_2$ of the normalized operand. If the sign bit is asserted, the normalized operand is conditionally complemented. Due to sign-symmetry, sign bit $a_2$ is not needed. Pre-processing element 312 yields table input $[a'_1a'_3:a'_{14}]$, where $a'_i$ is the complement of $a_i$, for memory 314.

Memory 314 is substantially similar to memory 214, but has 128 rows 318, with 142 bits per row 318, where a row 318 corresponds lower order values $[a'_1a'_3:a'_9]$. In the illustrated embodiment, system 310 includes three stages 340*a-c*. First stage 340*a* uses low order values $[a'_1a'_3:a'_8]$ as address bits to select a row 318. In one embodiment, the operations of first stage 340*a* may be performed by a circuit that uses the low order values to select the appropriate row 318.

The second and third stages 340*b-c* determine higher order bits for the sub-trees. Selectors 322 and 324 select bit fields and then select the higher order bits from the bit fields. Selecting bits from a row 318 leaves one or more remaining bits of the row 318, where at least one remaining bit is disposed between two bit fields.

The second stage 340*b* determines middle order bits for middle-level sub-trees. In the illustrated embodiment, second stage 340*b* corresponds to sub-trees between levels 7 and 8, which are represented by 6-bit fields. Middle order values $[a'_9:a'_{11}]$ are used to select one of the fields. Two bits are extracted from the selected field. Value $[a'_9]$ is used to select one bit, and values $[a'_9:a'_{10}]$ are used to select another bit.

The third stage 340*c* selects high order bits for the high-level sub-trees. In the illustrated embodiment, there are 16 sub-trees between level 7 and level 10 formed as 16 7-bit bytes. Values $[a'_9:a'_{12}]$ are used to select one of 16 bytes. Four bits are extracted from the selected byte. Value $[a'_{13}]$ is used to select one bit from the selected byte, and values $[a'_{13}:a'_{14}]$ are used to select another bit. The other two bits are extracted directly without selection. The three stages 340 concatenate the address bits and selected bits to yield a 13-bit output.

Post-processing element 344 processes the table output. In one embodiment, post-processing element 344 de-normalizes the table output to compensate for the normalization performed by pre-processing element 312. Post-processing element 344 also pads bits with indices less than the power of the input operand with zeros, and fills the bits with larger indices with lookup values. Post-processing element 344 performs conditional complementation on the table output in a manner substantially similar to that of post-processing element 244.

Figure 6:
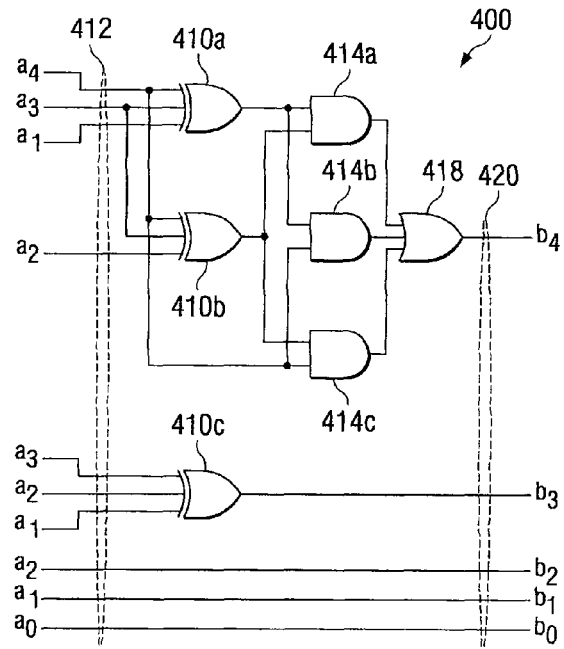
FIG. 6 illustrates an example of a circuit that may be used with the system of FIG. 1.

FIG. 6 illustrates an example of a circuit 400 operable to select the appropriate table row and/or generate at least a portion of the table output. Circuit 400 may output an n-bit integer function value that may be used to generate an m-bit integer function value, m>n, through table lookup. In the embodiment, circuit 400 represents the five low order bits of the multiplicative inverses modulo $2^5$.

Circuit 400 includes inputs 412, exclusive-OR gates 410*a-c*, AND gates 414*a-c*, an OR gate 418, and outputs 420 coupled as shown. Circuit 400 receives input $[a_0:a_4]$ and generates output $[b_0:b_4]$ from the input. The output may be used to select a row of a table.

Certain embodiments of the invention may provide one or more technical advantages. A technical advantage of one embodiment may be that a system includes hardware support for integer valued functions. The hardware support may allow for more efficient calculation of integer valued functions.

Another technical advantage of one embodiment may be that the system represents a hierarchical tree for an integer valued function. The system includes a lookup table that stores bits representing at least a portion of the tree. The table has subsets (such as rows). Each subset is associated with particular lower order values of operands and stores bits representing sub-trees corresponding to the lower order values. The lower order values of an input operand serve as an address to select the appropriate subset to calculate the table output for the operand. Organizing the lookup table into such subsets may allow for a reduced table size.

Another technical advantage of one embodiment may be that the system performs pre-processing of the input operand to generate table input for the table. For example, the operand may be normalized to determine a binary exponent for the operand. As another example, a sign bit of the operand may be determined. Pre-processing may allow for a reduced table size.

Another technical advantage of one embodiment may be that the system performs post-processing of table output to generate the function output. For example, the table output may be de-normalized. As another example, conditional complementation may be performed on the table output. Post-processing may also allow for a reduced table size.

Another technical advantage of one embodiment may be that one or more circuits may be used to generate the function output. For example, a circuit may be used to select the appropriate subset and/or generate at least a portion of the function output.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for determining a table output of a table representing a hierarchical tree, comprising:
   determining, by one or more processors, an address from a portion of a table input;
   selecting, by the one or more processors, a subset of a memory according to the address, the memory representing the hierarchical tree for an integer valued function, the subset representing a subtree of the hierarchical tree;
   selecting, by the one or more processors, a plurality of bit fields from the subset;
   extracting, by the one or more processors, a plurality of bits from the plurality of bit fields; and
   determining, by the one or more processors, the table output from the extracted bits.

2. The method of claim 1, the subset of the memory comprising a row of the memory.

3. The method of claim 1, further comprising:
   pre-processing an input operand to yield the table input.

4. The method of claim 1, further comprising:
   pre-processing an input operand to yield the table input, the pre-processing comprising:
   normalizing the input operand to determine a binary exponent for the input operand.

5. The method of claim 1, further comprising:
   pre-processing an input operand to yield the table input, the pre-processing comprising:
   determining a sign bit of the input operand.

6. The method of claim 1, wherein selecting the plurality of bit fields from the subset further comprises:
   leaving one or more remaining bits of the subset, at least one remaining bit disposed between two bit fields of the plurality of bit fields.

7. The method of claim 1, wherein determining the table output from the extracted bits further comprises:
   concatenating the extracted bits and the address to form the table output.

8. The method of claim 1, further comprising:
   post-processing the table output to yield a function output.

9. The method of claim 1, further comprising:
   post-processing the table output to yield a function output, the post-processing comprising:
   de-normalizing the table output.

10. The method of claim 1, further comprising:
    post-processing the table output to yield a function output, the post-processing comprising:
    performing conditional complementation on the table output.

11. The method of claim 1, further comprising:
    determining at least a portion of a function output using a circuit.

12. A system for determining a table output of a table representing a hierarchical tree, comprising:
    a memory operable to store a representation of the hierarchical tree for an integer valued function; and
    one or more stages coupled to the memory and operable to:
    determine an address from a portion of a table input;
    select a subset of the memory according to the address, the subset representing a subtree of the hierarchical tree;
    select a plurality of bit fields from the subset;
    extract a plurality of bits from the plurality of bit fields; and
    determine the table output from the extracted bits.

13. The system of claim 12, the subset of the memory comprising a row of the memory.

14. The system of claim 12, further comprising:
    a pre-processing element operable to pre-process an input operand to yield the table input.

15. The system of claim 12, further comprising:
    a pre-processing element operable to pre-process an input operand to yield the table input by:
    normalizing the input operand to determine a binary exponent for the input operand.

16. The system of claim 12, further comprising:
    a pre-processing element operable to pre-process an input operand to yield the table input by:
    determining a sign bit of the input operand.

17. The system of claim 12, the one or more stages further operable to select the plurality of bit fields from the subset by:
    leaving one or more remaining bits of the subset, at least one remaining bit disposed between two bit fields of the plurality of bit fields.

18. The system of claim 12, the one or more stages further operable to determine the table output from the extracted bits by:
    concatenating the extracted bits and the address to form the table output.

19. The system of claim 12, further comprising:
    a post-processing element operable to post-process the table output to yield a function output.

20. The system of claim 12, further comprising:
    a post-processing element operable to post-process the table output to yield a function output by:
    de-normalizing the table output.

21. The system of claim 12, further comprising:
    a post-processing element operable to post-process the table output to yield a function output by:
    performing conditional complementation on the table output.

22. The system of claim 12, the one or more stages further comprising:
    a circuit operable to determine at least a portion of a function output.

23. A system for determining a table output of a table representing a hierarchical tree, comprising:
- means for determining an address from a portion of a table input;
- means for selecting a subset of a memory according to the address, the memory representing the hierarchical tree for an integer valued function, the subset representing a subtree of the hierarchical tree;
- means for selecting a plurality of bit fields from the subset;
- means for extracting a plurality of bits from the plurality of bit fields; and
- means for determining the table output from the extracted bits.

24. A system for determining a function output of an integer valued function, comprising:
- a memory operable to store a representation of a hierarchical tree for the integer valued function; and
- one or more stages coupled to the memory and comprising:
  - a circuit operable to:
    - determine a circuit output from one or more input bits of an input operand;
- the one or more stages further operable to:
  - determine an address from a portion of a table input generated from the input operand;
  - select a subset of the memory according to the address, the subset representing a subtree of the hierarchical tree;
  - select a plurality of bit fields from the subset;
  - extract a plurality of bits from the plurality of bit fields; and
  - determine a table output from the extracted bits; and
  - determine the function output from the table output and the circuit output.

* * * * *